US012669515B2

(12) United States Patent
Sivakumar et al.

(10) Patent No.: US 12,669,515 B2
(45) Date of Patent: Jun. 30, 2026

(54) METHOD AND SYSTEM FOR AUTOMATED RETRIEVAL AND SCANNING OF GLASS SLIDES WITHIN A RESTRICTED SPATIAL ENVIRONMENT

(71) Applicant: Pramana, Inc., Cambridge, MA (US)

(72) Inventors: Aparajit Sivakumar, Silvassa (IN); Mohammad Abdul Sulaiman, Visakhapatnam Andhra Pradesh (IN); Prasanth Perugupalli, Cary, NC (US)

(73) Assignee: Pramana, Inc., Cambridge, MA (US)

( * ) Notice: Subject to any disclaimer, the term of this patent is extended or adjusted under 35 U.S.C. 154(b) by 0 days.

(21) Appl. No.: 18/385,978

(22) Filed: Nov. 1, 2023

(65) Prior Publication Data

US 2025/0138034 A1 May 1, 2025

(51) Int. Cl.
*G01N 35/00* (2006.01)
*G01N 21/01* (2006.01)
*G02B 21/34* (2006.01)

(52) U.S. Cl.
CPC ....... *G01N 35/00029* (2013.01); *G01N 21/01* (2013.01); *G01N 2021/0168* (2013.01); *G01N 2035/00039* (2013.01); *G01N 2035/00138* (2013.01); *G02B 21/34* (2013.01)

(58) Field of Classification Search
CPC ............. G01N 35/00029; G01N 21/01; G01N 21/2021; G01N 21/0168; G01N 2035/00039; G01N 2035/00138; G02B 21/34
See application file for complete search history.

(56) References Cited

U.S. PATENT DOCUMENTS

| | | | | |
|---|---|---|---|---|
| 4,248,498 A | * | 2/1981 | Georges | ................. G02B 21/26 356/244 |
| 5,690,892 A | * | 11/1997 | Babler | ............. G01N 35/00029 422/65 |
| 9,377,480 B2 | | 6/2016 | Asahara | |
| 10,704,996 B2 | * | 7/2020 | Foggi | ..................... G01N 1/312 |
| 11,193,950 B2 | | 12/2021 | Von | |
| 2004/0072225 A1 | * | 4/2004 | Rollins | ................ B01J 19/0046 435/6.19 |
| 2010/0070739 A1 | * | 3/2010 | Nakamura | ................ G06F 9/54 712/E9.002 |
| 2014/0273088 A1 | * | 9/2014 | Winther | ................. G01N 1/312 422/65 |
| 2015/0177504 A1 | * | 6/2015 | Bickert | .................. G02B 21/34 348/80 |
| 2015/0323776 A1 | * | 11/2015 | Dyson-Holland | ... G02B 21/362 348/79 |
| 2016/0308795 A1 | * | 10/2016 | Cheng | ..................... H04L 51/02 |
| 2018/0101554 A1 | * | 4/2018 | Agarwal | ............. G06F 16/2228 |

(Continued)

FOREIGN PATENT DOCUMENTS

WO 2023196256 A2 10/2023

*Primary Examiner* — Benjamin R Whatley
*Assistant Examiner* — Curtis A Thompson
(74) *Attorney, Agent, or Firm* — CALDWELL LLC

(57) ABSTRACT

A system and method for automated slide retrieval and scanning is disclosed. The system comprises at least a processor configured to receive, from a user, a set of scan requirements, identify a current slide configuration, generate an operational scan sequence based on the received scan requirements and the current slide configuration, and execute the generated operational scan sequence.

17 Claims, 8 Drawing Sheets

(56)        References Cited

U.S. PATENT DOCUMENTS

| | | | | |
|---|---|---|---|---|
| 2019/0101554 A1* | 4/2019 | Newberg | ......... | G01N 35/00623 |
| 2021/0326754 A1* | 10/2021 | Suzuki | .................... | G06N 3/08 |
| 2022/0283679 A1* | 9/2022 | Dailey | ................. | G06F 3/0484 |
| 2023/0031492 A1* | 2/2023 | Shah | .................... | B41J 2/17513 |
| 2023/0055997 A1 | 2/2023 | Shah | | |
| 2024/0044925 A1* | 2/2024 | Creasey | ............. | G01N 35/0099 |

* cited by examiner

Slide Scan Control Flow

State System 400

700

705

Receive Scan Requirements

710

Sense Current Slide Configuration

715

Generate Operational Scan Sequence

720

Execute Generated Operational Scan Sequence

METHOD AND SYSTEM FOR AUTOMATED RETRIEVAL AND SCANNING OF GLASS SLIDES WITHIN A RESTRICTED SPATIAL ENVIRONMENT

FIELD OF THE INVENTION

The present invention generally relates to the field of process automation. In particular, the present invention is directed to a system for automated retrieval and scanning of glass slides within a restricted spatial environment.

BACKGROUND

In the digital pathology workflow, the tissue goes through multiple prior steps before it reaches the imaging step using the automated microscopes. The typical prior steps are processing, embedding, microtomy, staining and coverslipping. For seamless workflow automation, it is required that the stainer baskets that are used to hold slides during staining and coverslipping steps are used for digitizing the slides using automated microscopes as well. For use of stainer baskets along with high throughput scanners, the slides need to be picked from the stainer basket using a robotic arm with a gripper. The stainer basket design and the robotic gripper design are fixed as they are designed independently. The gripper design does not allow for picking of slides from the stainer basket without a height differentiation as the spacing of slides in the stainer basket is less than the required spacing for the gripper to work without damaging the slides.

SUMMARY OF THE DISCLOSURE

In an aspect, a system for automated slide retrieval and scanning is disclosed. The system comprises at least a processor configured to receive, from a user, a set of scan requirements, identify a current slide configuration, generate an operational scan sequence based on the received scan requirements and the current slide configuration, and execute the generated operational scan sequence.

In another aspect, a method for automated slide retrieval and scanning is disclosed. The method comprises receiving, by the at least a processor, from a user, a set of scan requirements, identifying, by the at least a processor, a current slide configuration, generating, by the at least a processor, an operational scan sequence based on the received scan requirements and the identified slide configuration, and executing, by the at least a processor, the generated operational scan sequence.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for automated slide retrieval and scanning comprising at least a processor configured to receive, from a user, a set of scan requirements, identify a current slide configuration, generate an operational scan sequence based on the received scan requirements and the current slide configuration, and execute the generated operational scan sequence. In an embodiment, the system coordinates a gripper's movements to effectively meet the scanning demands of the user.

Aspects of the present disclosure can be used to overcome the spatial limitations of the standardized stainer basket through process automation. The disclosed system not only automatedly executes the slide scanning process, but it analyzes and coordinates the most efficient process that both meets the needs of the user and overcomes the spatial accessibility limitations caused by the compact stainer basket.

Figure 1:
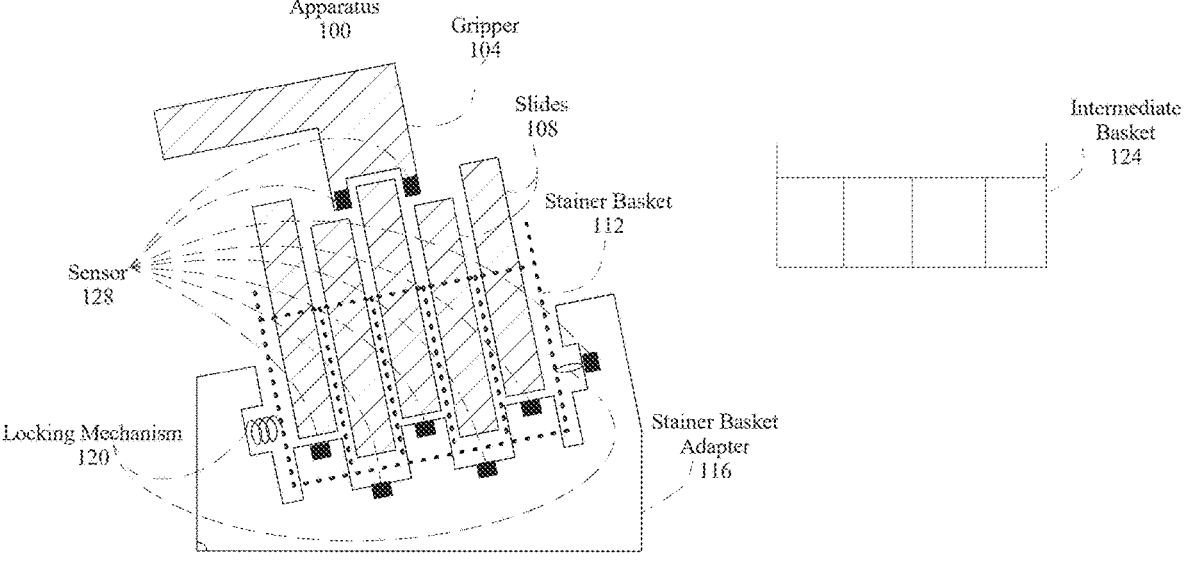
FIG. 1 illustrates the physical structure of the slide retrieval and scanning system.

Referring now to FIG. 1, the physical structure of the slide retrieval and scanning system apparatus is illustrated. Apparatus 100 includes a gripper 104. Gripper 104 is a standardized mechanical device used to physically seize and relocate the glass stainer slides. Gripper 104 is neither modified nor claimed as part of this disclosure, with the exception of coordinating its sequence and selections. Slides 108 are the glass stainer slides containing the biopsy material or other substance to be scanned. Slides 108 are also standardized in their physical form and in no way claimed as part of this disclosure. Stainer basket 112 is the container in which the slides 108 are stored when not being actively used. Stainer basket 112 is also a standardized mechanical device which is neither changed nor claimed as part of this disclosure.

Still referring to FIG. 1, a stainer basket adapter 116 structure may be used to augment the automated scanning process, and may include physical features to vertically support a weight and loading of a stainer basket 112, a profile configured to differentiate by height within the stainer basket, wherein the profile has within a stainer basket 112, an inclined base which applies a uniform tilt angle to a stainer basket and all slides within stainer basket, and a spring-loaded ball locking mechanism to keep a stainer basket stationary during slide insertions and withdrawals while still allowing for stainer basket removal by a user. Stainer basket adapter 116 structurally supports the weight of a stainer basket and all contained slides as well as any transitory vertical forces applied by gripper 104 in its slide insertion or withdrawal movements. Stainer basket adapter 116 may additionally be fixed in place by adhesive, hook and loop fasteners, or any other mechanical attachment method to counteract horizontal forces generated by stainer basket 112 insertion or removal, or any slide 108 insertions or removals.

Still referring to FIG. 1, stainer basket adapter 116 may apply a profile configured to differentiate slides by height within the stainer basket. This height differentiation allows for gripper 104 to retrieve slides 108 from stainer basket 112. Without any height differentiation, all slides 108 rest within the stainer basket 112 at the same height and are only accessible by gripper 104 if the immediately adjacent slides to the desired slide are first removed. The height differentiation within stainer basket adapter 116 may be achieved by alternating raised platforms which transfer the alternating elevation to slides 108 through physical contact with the bottom of stainer basket 112.

Still referring to FIG. 1, stainer basket adapter 116 applies a small incline to stainer basket 112. The angle may be as little as necessary to ensure a consistent tilt on all glass slides 108 contained within stainer basket 112, or it may be as large as necessary to support gripper 104 retrievals and insertions, up to the point where slides 108 are no longer confidently secured within stainer basket 112 by gravity alone. In a non-limiting embodiment, stainer basket adapter 116 may apply an incline of 5° off horizontal. In a separate non-limiting embodiment, stainer basket adapter 116 may set stainer basket 112 on a 90° angle, wherein the stainer basket rests on its side.

Still referring to FIG. 1, stainer basket adapter 116 employs a locking mechanism 120 to maintain stainer basket 112 and all slides 108 in place unless user purposefully withdraws stainer basket 112 from stainer basket adapter 116. In a non-limiting embodiment, locking mechanism 120 may employ adhesive, hook and loop fasteners, or any other mechanical fixation method to counteract the vertical forces generated by stainer basket 112 insertion or removal, or any slide 108 insertions or removals. Locking mechanism 120 may use a spring-loaded ball locking device wherein the device applies a spring-based force to one side of stainer basket 112 and a trapped, rotatable ball, or similar device, applies an equal pressure on the opposite side of stainer basket 112. This ball locking mechanism may be manually or electronically controlled. When the user chooses to withdraw stainer basket 112 from stainer basket adapter 116, the outward force of a human will overcome the resistive locking mechanism to release the stainer basket 112. Locking mechanism 120 may use a release mechanism to disengage locking mechanism 120 and allows a user to withdraw the stainer basket 112 with reduced resistance.

Still referring to FIG. 1, a gripper 104 apparatus may be used to insert, withdraw, and relocate individual slides 108 in accordance with the generated operational scan sequence. Gripper 104 may consist of any device capable of mechanically grasping individual slides 108 and relocating them to the same or a different stainer basket 112 slide slot, an intermediate basket 124 slide slot, or a scanning position. One or more sensors 128 may be used to sense the presence of a glass slide in each individual stainer basket slot and within the gripper 104 pinchers to detect if it has successfully seized a slide. These sensors 128 may rely on any mechanism able to effectively identify the presence of a slide including but not limited to, pressure, magnetic sensors, mechanical switches, electrical relays, or light sensors. Sensors 128 may be communicatively connected to the system processor such that any changes in glass slide insertion, withdrawal, scan, or obstruction may be detected and relayed to the processor immediately to enable the processor to suspend gripper movements. Sensors 128 may additionally be used to detect the presence or void of the stainer basket 112 within the stainer basket adapter 116. In a non-limiting embodiment, gripper 104 may be a pinching device with rubber tips to avoid damaging the glass slides. In a non-limiting embodiment, gripper 104 may use suction cups to capture slides 108.

Still referring to FIG. 1, gripper 104 may contain multiple sensors within its structure to detect its motion and positioning. One or more sensors may include, without limitation, sensors such as rotary encoders, linear encoders, rack and pinion linear position and/or measurement systems, linear displacement sensors, and/or IMUs or components thereof, as described herein, to detect robot arm, position and/or angle at every joint, or the like. Sensors may detect a position of the gripper and individual pinchers relative to and/or within an environmental chamber or other location where an arm attachment is anchored and/or stowed; this may be achieved using "dead reckoning" with position sensors, and/or using an optical sensor such as a camera or the like, a magnetic sensor, or any other sensor that may occur to persons skilled in the art upon reviewing the entirety of this disclosure. Sensors may include a camera and/or fiber optic to observe action at a point such as where attachment is engaging with a workpiece and/or where robot arm is engaging with attachment. Optical tracking, using 2 or more cameras, in a chamber such as environmental chamber may be used to confirm position and movement of one or more objects therein, including robot arm, attachments, workpieces such as implants and/or angiogenic screws, or the like. Cameras may identify and track primary visual markers (i.e. elbow joints, gripper 104 tips, etc.) by optically monitoring defined visual sensors (i.e. color-coded sticker labels on gripper 104). For gripping, load sensors may be deployed at each "gripping pad" for pressure and displacement; a controller of robot arm may be configured to stop augmentation of pressure and/or release pressure if a load sensor reading is above a preconfigured threshold. Additionally, electrical contact-based sensors may be used to detect one or more primary gripper positions (i.e. idle state resting position, operationally ready, etc.) as well as when the gripper successfully contacts a stainer slide 108, the stainer basket 112, the intermediate basket 124, the scanner, or other verifiable positions. Gripper 104 may further rely on magnetic sensors, such as Hall-effect based sensors, to sense the magnetic field(s) of embedded magnets strategically located in prioritized sensor locations as described above. These Hall-effect sensors may be used to sense position and motion by converting the magnetic fields of the strategically placed sensors to a proportional electrical voltage which may be translated to relative proximity and identify position over time. Gripper may use Hall-effect rotary and/or position encoders, such as without limitation a digital and/or analog rotary position sensor or the like, which may include, without limitation, a rotary position sensor such as, in an non-limiting example, an AS5045B magnetic position sensor as produced by AMS AG of Unterpremstaetten, Austria, or functionally similar or equivalent products; Hall-effect position sensors may, in exemplary embodiments, detect absolute and/or relative angular position relative to a magnetic field such as a field produced by a permanent magnet, electromagnet, or the like. Further, gripper 104 may employ optical encoders such as a Renishaw open optical encoder which uses an electromechanical device to produce an electrical signal output proportional to the linear displacement of a linear guide or angular position of an input shaft. This optical encoder may use a rotary position measurement readhead and rotary scale, or an internal coded disc and sensing head, to optically sense the regularly-spaced scale markings to convert the position readings to a digital readout or motion controller. Similarly, the optical encoder may employ an absolute encoder using single, or redundant field-programmable multiturn encoding to detect position and motion. All methods of position sensing may be returned to the processor in real time for immediate feedback and corrective maneuvers where the position is not precisely as predicted.

Still referring to FIG. 1, gripper 104 may operate as a manufacturing device. This manufacturing device may include an automated manufacturing system. In some embodiments, an automated manufacturing system is a manufacturing device including a controller that controls one or more manufacturing steps automatically. Controller may include a sequential control device that produces a sequence of commands without feedback from other components of automated manufacturing system. Controller may include a feedback control device that produces commands triggered or modified by feedback from other components. Controller may perform both sequential and feedback control. In some embodiments, controller includes a mechanical device. In other embodiments, controller includes an electronic device. Electronic device may include digital or analog electronic components, including without limitation one or more logic circuits, such one or more logic gates, programmable elements such as field-programmable arrays, multiplexors, one or more operational amplifiers, one or more diodes, one or more transistors, one or more comparators, and one or more integrators. Electronic device may include a processor. Electronic device may include a computing device. Computing device may include any computing device as described below. Computing device may include a computing device embedded in manufacturing device; as a non-limiting example, computing device may include a microcontroller, which may be housed in a unit that combines the other components of manufacturing device. Controller may include a manufacturer client of plurality of manufacturer clients; controller may be communicatively coupled to a manufacturer client of plurality of manufacturer clients.

Still referring to FIG. 1, controller may operate within a closed loop processing environment. As used herein, a "closed loop processing environment" refers to a manner of operating by using information and/or feedback from sensors and/or user input to correct and/or execute scan sequence commands. Closed loop processing may be limited only by the availability of glass slides required to be scanned. Controller operations may be monitored, upgraded, revised, or modified by a machine-learning model. Using a machine-learning model may enable slide movements and scan operations with little to no active sensor feedback, but rather uses historical data to support accurate operations. Historical user engagements and scan operations may be used as training data to optimize the controller operations and scanning process generally. Machine-learning may also enable the initial generation of a scan sequence based on the training data generated within prior scan operations. In cases where machine-learning generates the initial sequence, gripper 104 operations may persevere through sensor feedback errors by relying on known successful iterations from historical scan operations. When an error is encountered, whether by erred slide sensing, or by malfunctioning mechanical equipment, or any other failure mode, controller may rely on the machine-learning model to correct the issue and continue with a modified scan operation. Training data input to the machine-learning model may include past and current slide 108 repositioning and scan operations, as well as training data from separate, remote devices to improve apparatus' 100 performance over time. This training data may consist of past scan operations, especially where a similar sequence is engaged, where user feedback validated the operation as successful in reference to the selected prioritization method. This type of positive feedback for a successful scan operation may promote the underlying calculations and biases for subsequent scan execution application. Further, training data may be retrieved from similar gripper devices which may be communicatively connected via a network to absorb the calculations, prioritizations, biases, and programming that has been validated as proper and optimized. Any available training data may be used to train the machine-learning model by the controller to improve operations. In a non-limiting embodiment, the controller may deploy the machine-learning model once sufficiently trained or may receive the trained model from a communicatively connected database and immediately deploy it. In a non-limiting embodiment, sensor data may be read by the machine-learning model in real time to modify and direct gripper commands as appropriate. Specifically, where sensor data reveals that the gripper is dropping slides at a higher rate when it grabs it from a certain angle, but by altering the angle by 3 degrees, the gripper successfully delivers slides 10% more often, then the machine-learning model may modify subsequent gripper operations to target the modified approach angle and thereby optimize scan operations through reduced failures. Machine-learning and training data is discussed in detail below in reference to FIG. 5.

Still referring to FIG. 1, controller may include a component embedded in manufacturing device; as a non-limiting example, controller may include a microcontroller, which may be housed in a unit that combines the other components of manufacturing device. Further continuing the example, microcontroller may have program memory, which may enable microcontroller to load a program that directs manufacturing device to perform an automated manufacturing process. Similarly, controller may include any other components of a computing device as described below in a device housed within manufacturing device. In other embodiments, controller includes a computing device that is separate from the rest of the components of manufacturing device; for instance, controller may include a personal computer, laptop, or workstation connected to the remainder of manufacturing device by a wired or wireless data connection. In some embodiments, controller includes both a personal computing device where a user may enter instructions to generate a program for turning workpiece into a finished product, and an embedded device that receives the program from the personal computing device and executes the program. Persons skilled in the art will be aware of various ways that a controller, which may include one or more computing devices, may be connected to or incorporated in an automated manufacturing system as described above.

Still referring to FIG. 1, controller may control components of automated manufacturing system; for instance, controller may control elements including without limitation tool changer to switch endmills, spindle or gear systems operatively coupled to spindle to regulate spindle rotational speed, linear movement of manufacturing tool, base table, or both, and rotation or rotational position of rotary table. As an example, controller may coordinate deposition and/or curing of material in additive manufacturing processes, where manufacturing device is an additive manufacturing device. Persons skilled in the art, upon reading the entirety of this disclosure, will be aware of similar automated control systems usable for various forms manufacturing.

Still referring to FIG. 1, controller may be designed and/or configured to perform any method, method step, or sequence of method steps in any embodiment described in this disclosure, in any order and with any degree of repetition. For instance, controller may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Controller may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, an object, part, and/or workpiece may be further processed as desired to finish that object, part, and/or workpieces. Examples of further process include but are not limited to secondary machining, polishing, coating such as powder coating, anodization, silk-screening, and any combination thereof, among others. Fundamentally, there is no limitation on the finishing steps, if any, that may occur for a finishing step.

Still referring to FIG. 1, system may further comprise an intermediate stainer basket 124 configured to retain transitory displaced slides. Where a scan sequence requires a slide be retrieved from a location and transferred to a separate location, but a destination slot is not yet available, system may transition the slide to intermediate stainer basket 124 where the slide may be temporarily stored until the destination becomes available for use.

Still referring to FIG. 1, the system may include the deposition of a transitory displaced side into the intermediate stainer basket 124 within the generated operational scan sequence. In cases where user scan requirements and/or designated prioritization method require the temporary displacement of one or more slides into a location that is already occupied by a slide, system may engage the intermediate stainer basket 124 for temporary storage until the targeted destination becomes available.

Figure 2:
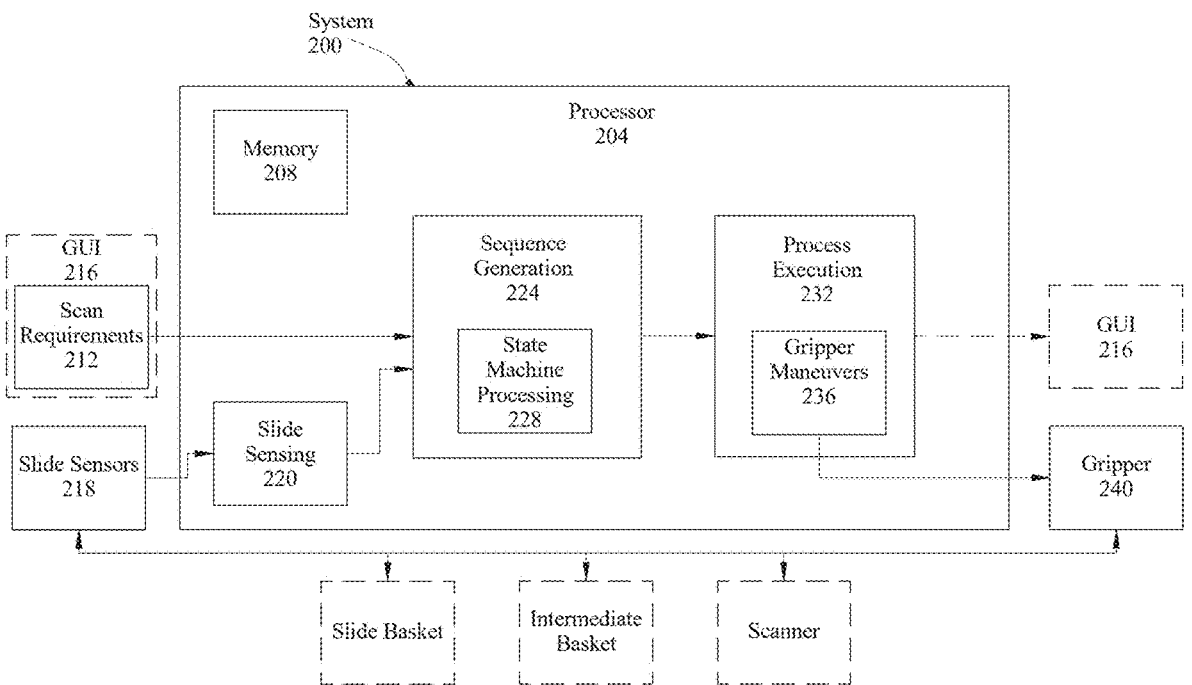
FIG. 2 is a block diagram of a retrieval and scan process according to an embodiment of the invention.

Referring now to FIG. 2, an exemplary embodiment of a system 200 to automatedly retrieve and scan glass slides is illustrated. The system 200 includes a computing device. The computing device includes a processor 204, which is communicatively connected to and configured by a memory 208. System 200 may include any computing device as described in this disclosure, including without limitation a microcontroller, microprocessor, digital signal processor (DSP) and/or system on a chip (SoC) as described in this disclosure. System 200 may include, be included in, and/or communicate with a mobile device such as a mobile telephone or smartphone. System 200 may include a single computing device operating independently, or may include two or more computing device operating in concert, in parallel, sequentially or the like; two or more computing devices may be included together in a single computing device or in two or more computing devices. System 200 may interface or communicate with one or more additional devices as described below in further detail via a network interface device. Network interface device may be utilized for connecting system 200 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. System 200 may include but is not limited to, for example, a computing device or cluster of computing devices in a first location and a second computing device or cluster of computing devices in a second location. System 200 may include one or more computing devices dedicated to data storage, security, distribution of traffic for load balancing, and the like. System 200 may distribute one or more computing tasks as described below across a plurality of computing devices of computing device, which may operate in parallel, in series, redundantly, or in any other manner used for distribution of tasks or memory between computing devices. System 200 may be implemented, as a non-limiting example, using a "shared nothing" architecture.

With continued reference to FIG. 2, processor 204 may be designed and/or configured to perform any method, method step, or sequence of method steps in any embodiment described in this disclosure, in any order and with any degree of repetition. For instance, processor 204 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 204 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 2, processor 204 is configured to receive a set of scan requirements 212 from a user. These scan requirements may be imported into system 200 through a graphical user interface 216, a chatbot interaction, manual control panel entries, or other methods of input. Scan requirements, as used herein, refer to a set of commands or priorities as determined by the user which are used to guide the sequencing and execution of the scanning process. Scan requirements 212 may be submitted in several different formats or types. Processor 204 may be configured to receive a complete specified order of slides to be scanned. This method allows the user to specify the precise order of every slide to be scanned. In cases where a slide is blocked by an adjacent slide, processor 204 may automatically identify the inhibiting slides and select them for transitory storage in the intermediate basket. In a non-limiting embodiment, where user selects all non-elevated slots to be scanned prior to any of the accessible elevated slots, processor 204 may query the number of slots available for temporary storage within the intermediate basket. When the number of slides that would need to be temporarily displaced to intermediate basket in order to access the first slide designated to be scanned exceeds the number of available slots within intermediate basket, processor 204 may generate an error informing the user of the impossibility of the sequence. In all other user input scenarios, processor 204 may identify the most efficient sequence to accomplish the user-designated scan sequence. Specific sequencing methods are discussed in detail below.

Still referring to FIG. 2, processor 204 may receive a prioritization method and/or a range of slides to be scanned as scan requirements 212. Prioritization method, as used herein, refers to a scheme to identify an order for slides to be scanned. Prioritization method may be based on importance ratings where each slide has a designated importance which is then compared to the importance of all other slides. Prioritization method may be based on the order the slides were identified within the stainer basket such that the first slide inserted into the stainer basket is designated as the highest scan priority and scanned first. Prioritization method may be based on group categorizations, wherein a set of slides may be designated as a certain priority while a separate group, or even all remaining slides are designated as a separate certain priority or left with a default baseline priority.

Still referring to FIG. 2, processor 204 may receive a general user direction to scan all slides. As used herein, a general user direction to scan all slides may occur via a scan button located within GUI 216 or on an access panel controlling scan operations. This general user direction to scan all slides applies when no specified order or prioritization method has been input. When this general user direction to scan all slides is engaged, processor 204 will rely on a baseline prioritization method to generate the sequence. Sequence generation is discussed in detail below.

Still referring to FIG. 2, processor 204 is configured to identify a current slide configuration. As used herein, "identify" refers to processor's 204 ability to detect and/or determine a presence or absence of a slide in each individual stainer basket slot. System may include one or more slide sensors 218, which may be communicatively connected to components of system such as processor and/or controller. Slide sensors 218 may include any sensors for sensing the position, quantity, configuration, type, and other physical characteristics associated with any stainer slides that are described in this disclosure or that may occur to a person skilled in the art upon reviewing the entirety of this disclosure. Slide sensors 218 may include physical sensors such as rotary and/or positional encoders as described above, which may be communicatively connected to processor 204 such that their identified slide positions are relayed to a slide sensing 220 module within processor 204. Slide sensing 220 may compile and organize the slide sensor 218 detections to facilitate execution of the scan requirements 212 within the user prioritization method. Slide sensing 220 then relays the stainer basket slide slot status for all slide slots to a sequence generation 224 module. Sequence generation 224 is discussed in detail below. Alternatively or additionally, a user may enter a command or instruction indicating a slide sequence to be used, or such a slide sequence may be received as data transmitted from a remote device.

Still referring to FIG. 2, processor 204 may sense each individual slot by detecting the weight of a slide for each slot of the stainer basket. This weight sensing may be accomplished by a pressure sensor within the bottom of each slot of the stainer basket or stainer basket adapter such that when a glass slide is inserted in the slot, the gravitationally applied pressure exceeds a threshold pressure and triggers a positively identified digital signal which may then be transmitted to the sequence generation 224 module.

Still referring to FIG. 2, processor 204 may sense each individual slot by reading a digital relay sensor of each slot of the stainer basket. A digital sensor relay may detect a switch position which is toggled based on the presence or absence of a glass slide in the stainer basket slot. The digital sensor may rely on any mechanism that enables a digital detection of the presence or absence of a scan slide in each stainer basket slot. In a non-limiting embodiment, this detection may occur through magnetic solenoid, mechanical switch, electrical relay, or any method capable of converting a slide presence within the specified stainer basket slot to a digital signal.

Still referring to FIG. 2, processor 204 is configured to generate an operational scan sequence based on the received scan requirements and the identified slide configuration. The sequence generation 224 module accepts scan requirements 212 from user and slide slot detections from slide sensing 220 as described above. Sequence generation 224, relying on the selected prioritization method, if any, and the identified stainer slide slot positions, generates the most efficient sequence to scan all slides needing to be scanned.

Still referring to FIG. 2, processor 204 may compute a sequence with minimum gripper movements that complies with the user's set of scan requirements. By minimizing gripper movements, the system uses the least energy and time to accomplish the requisite scans. Processor 204 may compute the most efficient sequence in any way available. In a non-limiting embodiment, where user commands a general direction to scan all slides and all stainer basket slots are occupied, sequence generation 224 may scan all slides starting with the most accessible slide first and working towards the least accessible. In this manner, sequence generation 224 may select the closest, elevated slide to be scanned first, working through all elevated slides in positional order moving away from the gripper. Once all elevated slides have been successfully scanned, sequence generation 224 may then scan all lowered slides in a similar manner, moving from closest to the gripper to farthest from it.

Still referring to FIG. 2, in order to calculate the minimum gripper movements, processor 204 may compute a score associated with each scan sequence based on the calculated gripper movements and select scan sequences to minimize and/or maximize the score, depending on whether an optimal result is represented, respectively, by a minimal and/or maximal score; a mathematical function, described herein as an "objective function," may be used by computing processor 204 to score each possible pairing. Objective function may be based on one or more objectives as described below. In various embodiments a score of a particular scan sequence may be based on a combination of one or more factors, including required gripper movements, number of glass slide displacements, or any other satisfactory metric as determined by the user. Each factor may be assigned a score based on predetermined variables. In some embodiments, the assigned scores may be weighted or unweighted.

Optimization of objective function may include performing a greedy algorithm process. A "greedy algorithm" is defined as an algorithm that selects locally optimal choices, which may or may not generate a globally optimal solution. For instance, processor 204 may select scan sequences so that scores associated therewith are the best score for each user prioritization method.

Still referring to FIG. 2, objective function may be formulated as a linear objective function, which processor 204 may solve using a linear program such as without limitation a mixed-integer program. A "linear program," as used in this disclosure, is a program that optimizes a linear objective function, given at least a constraint. For instance, user may require that as many scans as possible are completed within a 120 second time period. In various embodiments, system 200 may determine a scan sequence that maximizes a total score subject to a constraint such as the maximum time mentioned above. A mathematical solver may be implemented to solve for the set scan sequence that maximizes scores; mathematical solver may be implemented on processor 204 and/or another device in system 200, and/or may be implemented on a third-party solver. Minimum gripper movements calculations may rely on the machine-learning model for initial estimates as well as the later refinement calculations. Machine-learning model may further support the minimization calculations of any individual prioritization method and/or a combination thereof. In a non-limiting embodiment, user may desire the minimization of gripper 240 movements, execution time, and energy expended simultaneously. Machine-learning may enable the combined evaluation and execution of this type of complex prioritization. Machine-learning and training data are discussed in detail in reference to FIG. 5 below.

With continued reference to FIG. 2, optimizing objective function may include minimizing a loss function, where a "loss function" is an expression an output of which an optimization algorithm minimizes to generate an optimal result. As a non-limiting example, processor 204 may assign variables relating to a set of parameters, which may correspond to score components as described above, calculate an output of mathematical expression using the variables, and select the scan sequence that produces an output having the lowest size, according to a given definition of "size," of the set of outputs representing each of plurality of candidate ingredient combinations; size may, for instance, included absolute value, numerical size, or the like. Selection of different loss functions may result in identification of different potential pairings as generating minimal outputs. Calculation of the optimized scan sequence may be accomplished by a machine-learning model using training data from prior scan sequence generations to guide subsequent generations. This training data may be sourced from the correlation of sensor inputs, slide quantities and configurations, user prioritization, and other conditions present in past scan operations as they relate to the executed number of gripper 240 movements, distance of gripper 240 travel, energy required for gripper 240 execution, and/or time spent on gripper 240 placements. The machine-learning model may then store, analyze, and apply potential improvements to subsequent operations which may or may not replicate the input requirements of past operations.

Still referring to FIG. 2, processor 204 may use a state machine to generate, by the at least a processor, a sequence to handle all the raised slides, then handle all the sunken slides. As used herein, a "state machine" is a behavior model consisting of a finite number of states which transitions between the designated states based on the inputs provided. A state machine may be implemented through software or hardware. Processor 204 may employ a state machine processing 228 module to execute the state machine functions. Sequence generation 224 may use state machine processing 228 to identify the states and the requisite transitions to achieve the scans directed by the user. In a non-limiting embodiment, when all stainer basket scan slots are occupied and user directs processor 204 to scan all slides, the initial state would consist of all slides needing scanned. Each subsequent state would consist of one more slide having been scanned, and one less slide still needing scanned. The transition between these states would include any temporary displacement of slides, as necessary, and any gripper movements to accomplish the slide movements. State machine operation is discussed in detail in reference to FIG. 3 below.

Still referring to FIG. 2, processor 204 may use a state machine to generate, by the at least a processor, a sequence to temporarily displace one or more slides that are inhibiting access to a slide selected to be scanned in advance of the one or more inhibiting slides. As discussed above, in cases where scan requirements 212 obligate the scanning of a slide that is not currently accessible, sequence generation 224 will identify the state transitions required to access the inhibited slides and scan all designated slides in the order directed by the user. In cases where an initially inaccessible slide is required to be scanned next within the sequence, processor 204 may identify the adjacent slide or slides needing to be temporarily displaced to the intermediate basket to allow for the gripper to access the immediate next slide to be scanned. Once the initially inaccessible slide is withdrawn and scanned, processor 204 may assess whether to replace the slides that were temporarily displaced to the intermediate basket back to their original or a different stainer basket slot, or to leave the displaced slide(s) in the intermediate basket. This assessment will depend on which option presents the more efficient use of the gripper to accomplish the designated scan requirements 212. State machine operation is discussed in detail below.

Figure 3:
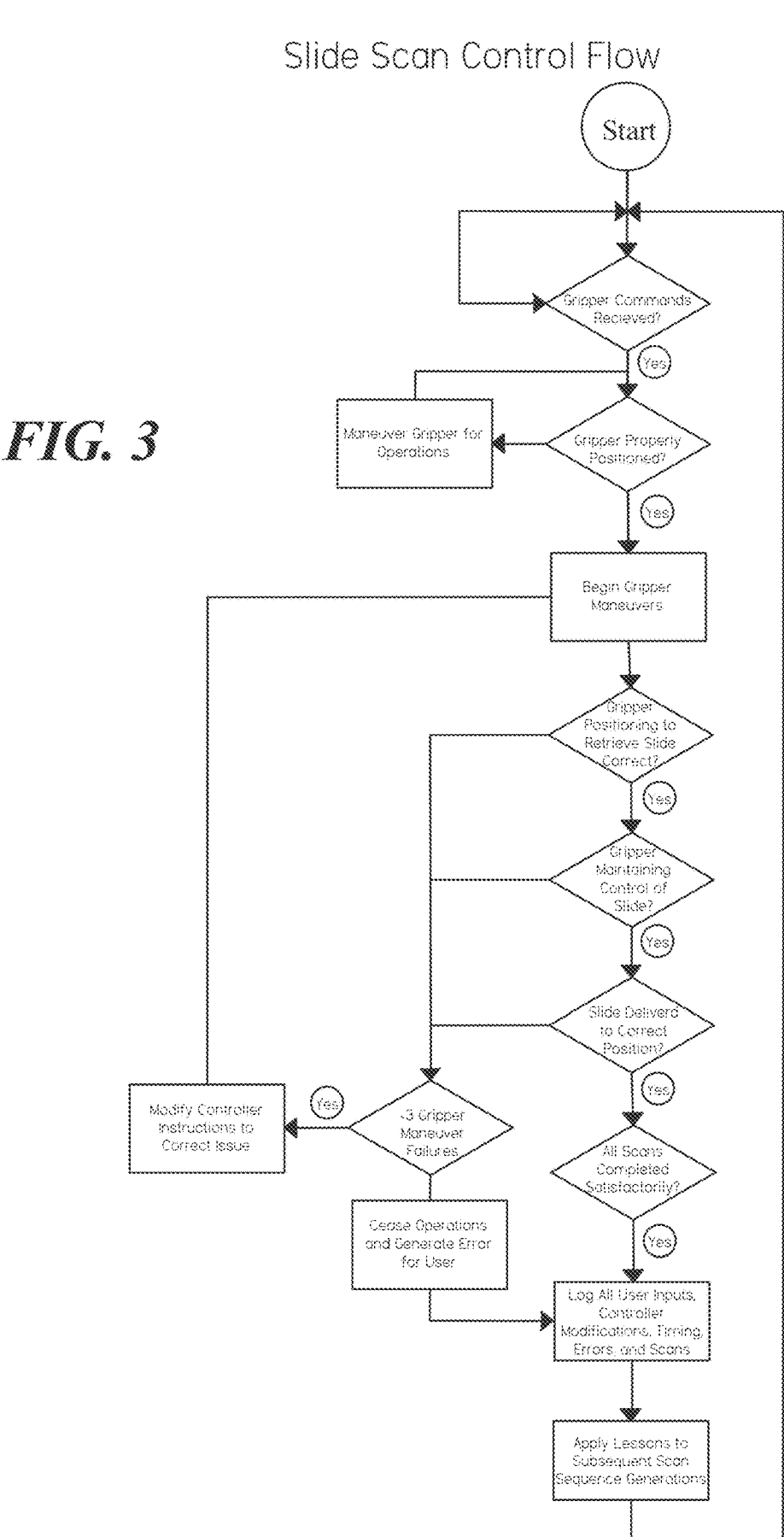
FIG. 3 is an exemplary control flow diagram for a glass slide retrieval and scan process controller modification.

Still referring to FIG. 2, processor 204 may heuristically develop, by the at least a processor, a set of gripper actions to scan all designated slides. As used herein to "heuristically develop" a scan sequence refers to an initially random sampling of all available sequences until an error or improvement is discovered. Once an error is discovered in the sequence, sequence generation 224 may discard the current sequence and either generate a new starting sequence or revert back to a predecessor sequence prior to the error encounter, and purposefully select a different subsequent step. Once a satisfactory sequence is identified, processor 204 may continue evaluating available options to identify more efficient sequences requiring less energy, time, displacement maneuvers, or any other priority as directed by the user. Upon evaluation of all available sequences, sequence generation 224 may confirm the most efficient sequence and relay it to the process execution module. Heuristic development of scan sequence may be fully controlled or revised by a machine-learning model. Based on historical data, the machine-learning model may adapt the heuristic scan sequence development process to bias it towards a reasonably likely to be successful sequence. This method of machine-learning integration may initially narrow the available options for scan sequences down to a number much easier to process and manage, thereby reducing processing times and producing more likely successful outputs. The machine-learning model may use the user inputs affiliated with the executed scan process to assess scan times, errors encountered, user satisfaction, movements required, and other observable characteristics to modify subsequent scan operations. Scan sequence modification for errors and machine-learning adaptations are illustrated in FIG. 3 below.

Still referring to FIG. 2, a generated operational scan sequence may be a function of the height differentiation of slides. Where no conflict with user scan requirements 212 or the designated prioritization method, processor 204 may rely on the current configuration of slides to generate the scan sequence. A generated scan sequence may designate currently elevated slides that are readily available for gripper 240 retrieval as higher priority to retrieve and displace those slides in order to gain access to lower stainer slides. Reliance on initial relative heights of stainer slides may not obligate selection of the initially raised slides first, but may factor into the overall function of scan sequence optimization.

Still referring to FIG. 2, processor 204 is configured to execute the generated operational scan sequence. To accomplish this execution of the generated operational scan sequence, process execution 232 converts the generated scan sequence to executable commands for the gripper and scanner computing devices to convert the sequence to a set of mechanical motions and digital scan activities. This conversion and command process may be automated, such that once user submits scan requirements 212 and processor 204 successfully generates a satisfactory sequence, the sequence is immediately converted and executed by the gripper and scanner. The conversion and command process may also require user intervention to approve the sequence, acknowledge any warnings or disclaimers, to control the timing, or for any reason deemed appropriate by the user. Similarly, upon completion of the scan sequence, a notification may be generated within GUI 216 or any other interface method. In a non-limiting embodiment, processor 204 may execute all scan sequence operations, then log the operations, including any abnormalities, errors, warnings, and/or successful completion. In a separate non-limiting embodiment, processor 204 may complete the scan sequence operations and enter an idle mode or simply shut down until again engaged by the user.

Still referring to FIG. 2, processor 204 may be configured to control the slide gripper through a gripper maneuvers 236 module. Gripper maneuvers 236 may directly command the mechanical movements required to execute the scans within the sequence generation 224 generated sequence. Gripper maneuvers 236 may be communicatively connected to the gripper 240 apparatus. Gripper 240 is the mechanical device that physically executes the slide displacements and maneuvers. In a non-limiting embodiment, the generated scan sequence, after being converted to the appropriate executable commands and properly formatted, may be immediately forwarded to the gripper 240 apparatus for execution, or may require a user approval prior to actual execution.

Gripper maneuvers 236 may further process the gripper 240 sensors and positioning to monitor for proper execution and handle any faults or errors in real time. In a non-limiting embodiment, when gripper maneuvers 236 senses any movement other than the precise motions in accordance with the specified commands, it may generate an error, cease slide transfers, and enter an idle state. Similarly, if a slide is detected by the gripper 240 pincher sensors where it should not be, the system may again generate an error, cease slide transfers, and enter an idle state. Any time the idle state is entered prematurely (i.e. before all programmed slide scans are completed and transferred to a drop basket), the system may require user intervention to correct the issue.

Still referring to FIG. 2, system 200 may use a graphical user interface to accept user inputs, communicate system responses and feedback, and to support configuration modifications. A "graphical user interface (GUI)," as used herein, is a graphical form of user interface that allows users to interact with electronic devices. In some embodiments, the GUI may include icons, menus, other visual indicators, or representations (graphics), audio indicators such as primary notation, and display information and related user controls. A menu may contain a list of choices and may allow users to select one from them. A menu bar may be displayed horizontally across the screen such as pull-down menu. When any option is clicked in this menu, then the pull-down menu may appear. A menu may include a context menu that appears only when the user performs a specific action. An example of this is pressing the right mouse button. When this is done, a menu may appear under the cursor. Files, programs, web pages and the like may be represented using a small picture in a graphical user interface. For example, links to decentralized platforms as described in this disclosure may be incorporated using icons. Using an icon may be a fast way to open documents, run programs etc. because clicking on them yields instant access. Information contained in user interface may be directly influenced using graphical control elements such as widgets. A "widget," as used herein, is a user control element that allows a user to control and change the appearance of elements in the user interface. In this context a widget may refer to a generic GUI element such as a check box, button, or scroll bar to an instance of that element, or to a customized collection of such elements used for a specific function or application (such as a dialog box for users to customize their computer screen appearances). User interface controls may include software components that a user interacts with through direct manipulation to read or edit information displayed through user interface. Widgets may be used to display lists of related items, navigate the system using links, tabs, and manipulate data using check boxes, radio boxes, and the like.

Still referring to FIG. 2, GUI 216 may be independently operated or contained within a remote device. As used herein, a "remote device" may consist of any device communicatively connected to processor 204 and capable of displaying a set of digital information as directed by processor 204. In a non-limiting embodiment, remote device may be a handheld digital device such as a smart mobile phone, a monitor with a wireless, HDMI, or similar connection mechanism, a projector, or any device capable of converting commands from processor 204 to a visible, human-readable context. Remote device may display the GUI 216 as discussed above. GUI 216 displayed information may be modified by the user, machine-learning processes, and/or training data from historical engagements. These modifications may include the information displayed, the color scheme, layout, language used, numeric system used (e.g. metric vs. English units, currency, time zone, etc.), or any other similar variation in the manner of display. Remote device may use machine-learning processes to dynamically modify GUI 216 based on training data and user inputs. In a non-limiting embodiment, a pothole repair plan may display the steps over a timeline. But in some circumstances, processor 204 may assess that a single specific portion of the engagement, for example the coordination of the fresh asphalt, is the primary cost/performance driver and that single factor may be prioritized in the display.

Referring now to FIG. 3, an exemplary control flow diagram for updates and modifications to a closed loop slide scan controller is illustrated. As discussed above, if any errors are encountered during the slide scan sequence, the controller may attempt to modify the gripper operations, still within the scan requirements, to overcome the encountered error. As a non-limiting example shown in FIG. 3, gripper position may not be initially placed in a proper position to conduct scan operations. In a non-limiting embodiment, gripper may have undergone some type of maintenance placing it in a position where scan operations are not possible without manual replacement, and/or errors introduced by actuators and/or other mechanical elements, quantization errors, or the like. Before or during scan operations, continuous sensor detections and/or comparisons may identify and/or correct improper gripper movements, errors in gripper movements, insufficient or excessive gripper arm pressure when carrying a slide, and/or inadequate delivery. Processor may generate and transmit to gripper corrections to modify a position, pressure, or other motion parameter of gripper based on a detected error. Alternatively or additionally, processor may detect using sensor feedback that gripper has failed to engage or move slide; upon such detection, processor may determine whether a detected error is a "fatal" error necessitating human intervention, such as a dropped or misplaced slide, or a "non-fatal" error that may be corrected by repeating one or more gripper motions and/or operations. System may respond to a fatal error by ceasing operation and/or outputting a signal and/or alert to indicate to a user that the fatal error has occurred and invention is required to resolve it. Where an error is non-fatal, system may allow for a limited number of re-attempts to properly place slide before identifying the error as fatal. While a threshold of 3 consecutive failures is shown as the threshold within FIG. 3, a user may designate more or less allowed attempts before abandonment of the operation. System may allow a limited number of controller attempts to fix any issue before continuing to log all relevant information and generating a user error notification.

Figure 4:
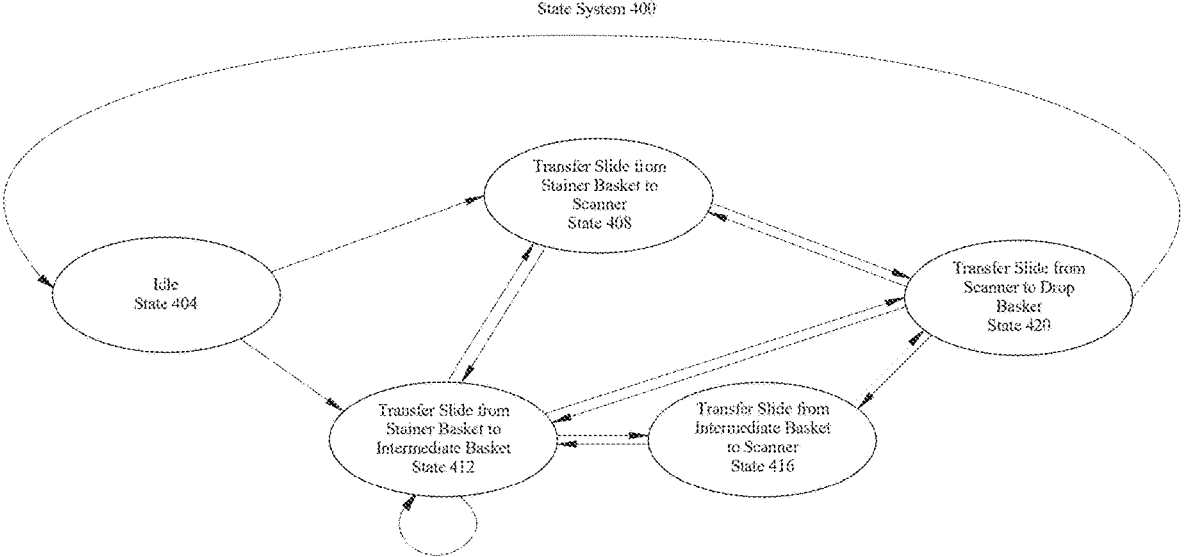
FIG. 4 is an exemplary state machine for a glass slide retrieval and scan process.

Referring now to FIG. 4, an exemplary state machine for a glass slide retrieval and scan process is illustrated. As discussed above, this state machine may be executed using exclusively hardware, exclusively software, or a combination thereof. As shown, the scanning and retrieval state system 400 may begin and end in an idle state 404. As used herein, the "idle state" refers to a condition wherein the system is not directed nor actively scanning any slides, but may be either in a standby status, conducting non-scanning operations such as software updates or mechanical maintenance, or completely powered down. Idle state may only be reached by removing any slides from the scanner, and presumes sufficient slots are available within the intermediate basket prior to transitioning from idle state 404. From state 404, the system may either transition to transfer a slide from stainer basket to scanner state 408 or transfer a slide from stainer basket to intermediate basket state 412. Transitioning from state 404 to either state 408 or state 412 may involve identification and/or reception of a scan sequence command and/or recognition of a properly placed gripper. All subsequent individual slide movement operations may be continuously conducted while all in-use gripper, stainer basket, intermediate basket, drop basket, and/or scanner sensors verify proper operation in accordance with the expected movements based on the scan sequence. Before completing any individual slide placement, the system may verify a proper delivery of the stainer slide in its programmed destination before allowing the gripper to proceed on to the next slide placement. If the expected sensor detections are not processed, gripper may be returned to an idle state with an error generated for the user to troubleshoot any causes. From state 408, system 400 may transition to state 412 or transfer the slide from the scanner to the drop basket state 420. From state 412, system 400 may transition back to state 408, onward to transfer the slide from intermediate basket to scanner state 416, or to state 420. State 416, since it places a slide on the scanner, can only transition to state 412 or state 420. State 420 is the only state wherein a transition to all other states, except itself, is available. Once the slide is removed from the scanner in state 420, system 400 may enter idle state 404, transition back to state 408, transition to state 412, or transition to the transfer slide from intermediate basket to scanner state 416. In a non-limiting embodiment, a standard scanning operation will pass through at least state 404 to state 408 on to state 420 before transitioning back to state 404. When multiple slides are involved, either state 408 or state 412 or both may be exercised multiple times until all glass slides are removed from the stainer basket. Although states illustrated in FIG. 4 are legal states, persons skilled in the art should understand that system may include additional processes to identify and exit illegal states. As discussed above in reference to FIG. 3, any errant movement or slide placement may be detected in real time and force the gripper to immediately restore the idle state.

Figure 5:
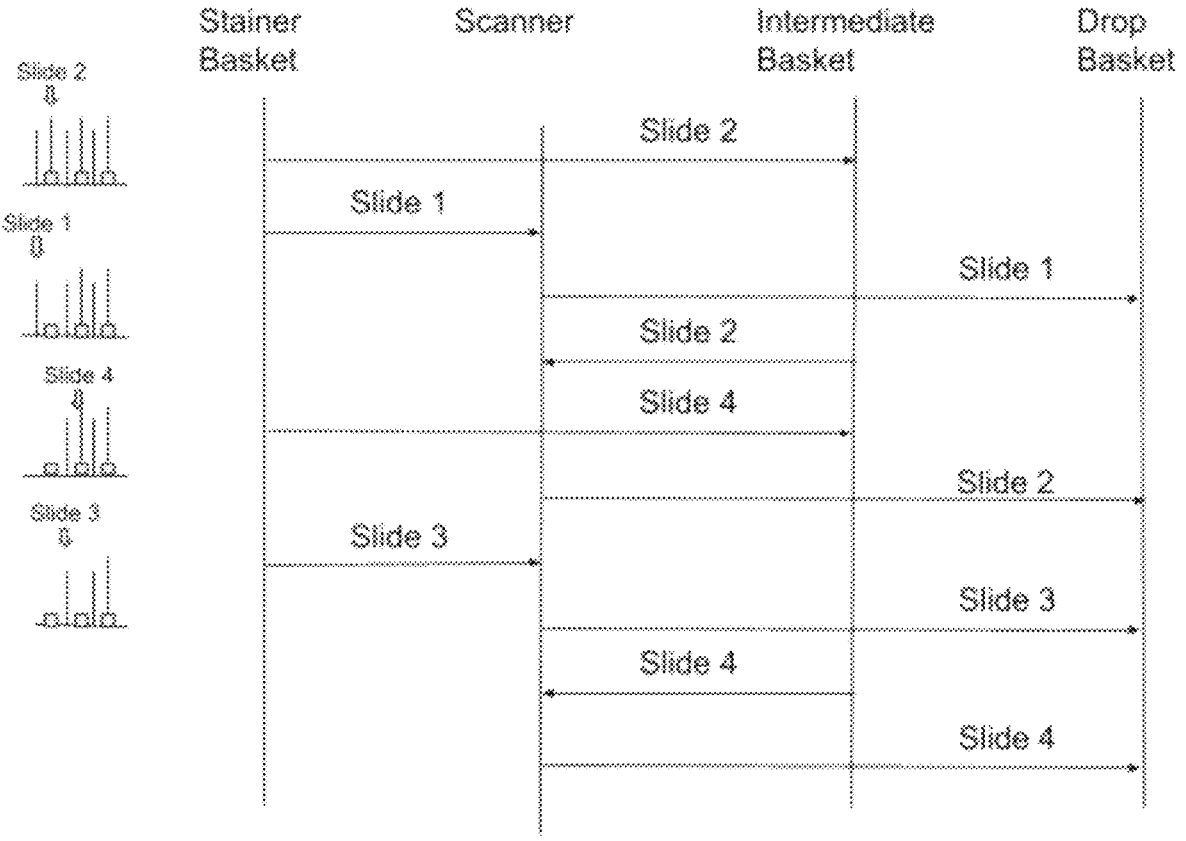
FIG. 5 is an exemplary sequence diagram of a slide retrieval and scan according to an embodiment of the invention.

Referring now to FIG. 5, a sequence diagram of an exemplary coordinated scanning sequence is illustrated. FIG. 5 shows an exemplary embodiment of a stainer basket with six slide slots, wherein Slot 1 is initially lowered, Slot 2 is initially elevated, and all subsequent slots alternate between lowered and elevated. Where the scan requirements dictate a numerically sequential scan order, Slide 2 may be temporarily relocated to intermediate basket to make Slide 1 accessible by gripper. Once Slide 2 is moved to intermediate basket, gripper may then transfer Slide 1 directly to scanner. Once scan of Slide 1 is complete, gripper may remove Slide 1 from scanner and place it in a drop basket for completed scans. Slide 2, as designated to be scanned next, may then be retrieved from intermediate basket and transferred to scanner. Similarly as before, once Slide 2 is removed to the drop basket, Slide 3 may be transferred directly to scanner, then to drop basket. Use of intermediate basket may allow for displacement of at least a slide to enable access to an initially inhibited slide.

Figure 6:
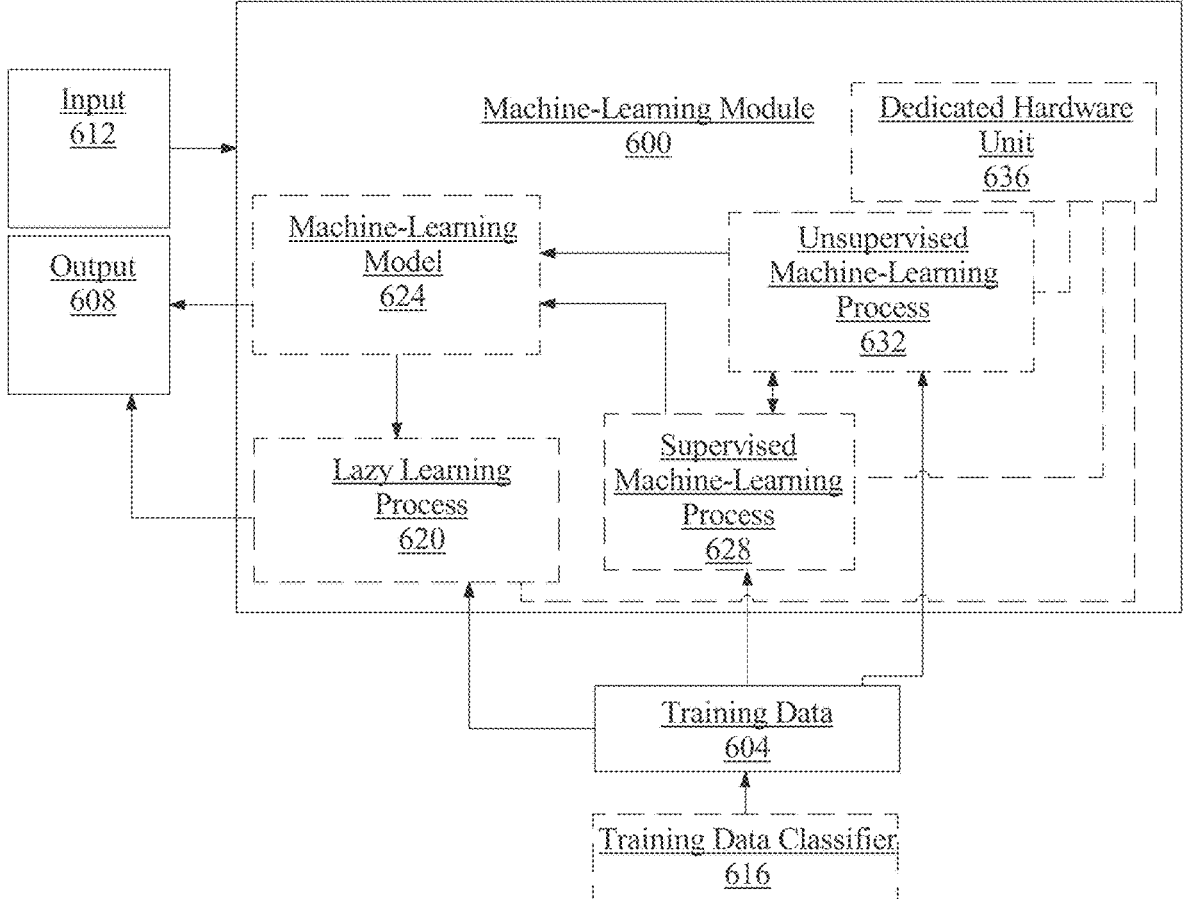
FIG. 6 is a block diagram of an exemplary machine-learning process.

Referring now to FIG. 6, an exemplary embodiment of a machine-learning module 600 that may perform one or more machine-learning processes as described in this disclosure is illustrated. Machine-learning module 600 may perform determinations, classification, and/or analysis steps, methods, processes, or the like as described in this disclosure using machine-learning processes. A "machine-learning process," as used in this disclosure, is a process that automatedly uses training data 604 to generate an algorithm instantiated in hardware or software logic, data structures, and/or functions that will be performed by a computing device/module to produce outputs 608 given data provided as inputs 612; this is in contrast to a non-machine-learning software program where the commands to be executed are determined in advance by a user and written in a programming language.

Still referring to FIG. 6, "training data," as used herein, is data containing correlations that a machine-learning process may use to model relationships between two or more categories of data elements. For instance, and without limitation, training data 604 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 604 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 604 according to various correlations; correlations may indicate causative and/or predictive links between categories of data elements, which may be modeled as relationships such as mathematical relationships by machine-learning processes as described in further detail below. Training data 604 may be formatted and/or organized by categories of data elements, for instance by associating data elements with one or more descriptors corresponding to categories of data elements. As a non-limiting example, training data 604 may include user inputs, such that entry of a given user selection may be mapped to one or more descriptors of categories. Elements in training data 604 may be linked to descriptors of categories by tags, tokens, or other data elements; for instance, and without limitation, training data 604 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 6, training data 604 may include one or more elements that are not categorized; that is, training data 604 may not be formatted or contain descriptors for some elements of data. Machine-learning algorithms and/or other processes may sort training data 604 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 604 to be made applicable for two or more distinct machine-learning algorithms as described in further detail below. Training data 604 used by machine-learning module 600 may correlate any input data as described in this disclosure to any output data as described in this disclosure. As a non-limiting illustrative example a set of architecture profile characteristics may be used as inputs wherein training data from historical engagements supports affiliating some, all, or none of the architecture profile attributes with certain classifier descriptors. In a specific non-limiting embodiment, a set of scan requirements may include prioritizing slides 1-3 to be scanned immediately, which may apply a classifier descriptor of "highest priority" and "scan" based not only on those words appearing, but on historical engagements showing that those descriptors are productive and accurate.

Further referring to FIG. 6, training data may be filtered, sorted, and/or selected using one or more supervised and/or unsupervised machine-learning processes and/or models as described in further detail below; such models may include without limitation a training data classifier 616. Training data classifier 616 may include a "classifier," which as used in this disclosure is a machine-learning model as defined below, such as a data structure representing and/or using a mathematical model, neural net, or program generated by a machine-learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 600 may generate a classifier using a classification algorithm, defined as a processes whereby a computing device and/or any module and/or component operating thereon derives a classifier from training data 604. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 616 may classify elements of training data to a certain type of prioritization method, wherein the sub-population of certain scan sequences require a unique set of steps or calculations that distinguish them from the multitude of scan sequences.

With further reference to FIG. 6, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving or retrieving a missing input and/or output value and correlating the missing input and/or output value with a corresponding output and/or input value collocated in a data record with the retrieved value, provided by a user and/or other device, or the like.

Still referring to FIG. 6, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value.

As a non-limiting example, and with further reference to FIG. 6, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 6, computing device, processor, and/or module may be configured to precondition one or more training examples. For instance, and without limitation, where a machine-learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by up-sampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs down-sampled to smaller numbers of units, and a neural network or other machine-learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been down-sampled to smaller numbers of pixels, and a neural network or other machine-learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 6, computing device, processor, and/or module may down-sample elements of a training example to a desired lower number of data elements. As a non-limiting example, a high pixel count image may have 256 pixels, however a desired number of pixels may be 128. Processor may down-sample the high pixel count image to convert the 256 pixels into 128 pixels. In some embodiments, processor may be configured to perform down-sampling on data. Down-sampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Still referring to FIG. 6, machine-learning module 600 may be configured to perform a lazy-learning process 620 and/or protocol, which may alternatively be referred to as a "lazy loading" or "call-when-needed" process and/or protocol, may be a process whereby machine-learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 604. Heuristic may include selecting some number of highest-ranking associations and/or training data 604 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 6, machine-learning processes as described in this disclosure may be used to generate machine-learning models 624. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 624 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 624 may be generated by creating an artificial neural network, such as a convolutional neural network comprising an input layer of nodes, one or more intermediate layers, and an output layer of nodes. Connections between nodes may be created via the process of "training" the network, in which elements from a training data 604 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 6, machine-learning algorithms may include at least a supervised machine-learning process 628. At least a supervised machine-learning process 628, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include labeled seed data, as described above as inputs, vector clustering, as described above as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 604. Persons skilled in the art, upon reviewing the entirety of this disclosure, will be aware of various possible variations of at least a supervised machine-learning process 628 that may be used to determine relation between inputs and outputs. Supervised machine-learning processes may include classification algorithms as defined above.

With further reference to FIG. 6, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 6, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 6, machine-learning processes may include at least an unsupervised machine-learning processes 632. An unsupervised machine-learning process, as used herein, is a process that derives inferences in data sets without regard to labels; as a result, an unsupervised machine-learning process may be free to discover any structure, relationship, and/or correlation provided in the data. Unsupervised processes 632 may not require a response variable; unsupervised processes 632 may be used to find interesting patterns and/or inferences between variables, to determine a degree of correlation between two or more variables, or the like.

Still referring to FIG. 6, machine-learning module 600 may be designed and configured to create a machine-learning model 624 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 6, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 6, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAS, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 6, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally triggered by receipt and/or generation of one or more new training examples; a number of new training examples may be compared to a preconfigured threshold, where exceeding the preconfigured threshold may trigger retraining, deployment, and/or instantiation.

Still referring to FIG. 6, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above. Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 6, one or more processes or algorithms described above may be performed by at least a dedicated hardware unit 636. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 636 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 636 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 636 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 7:
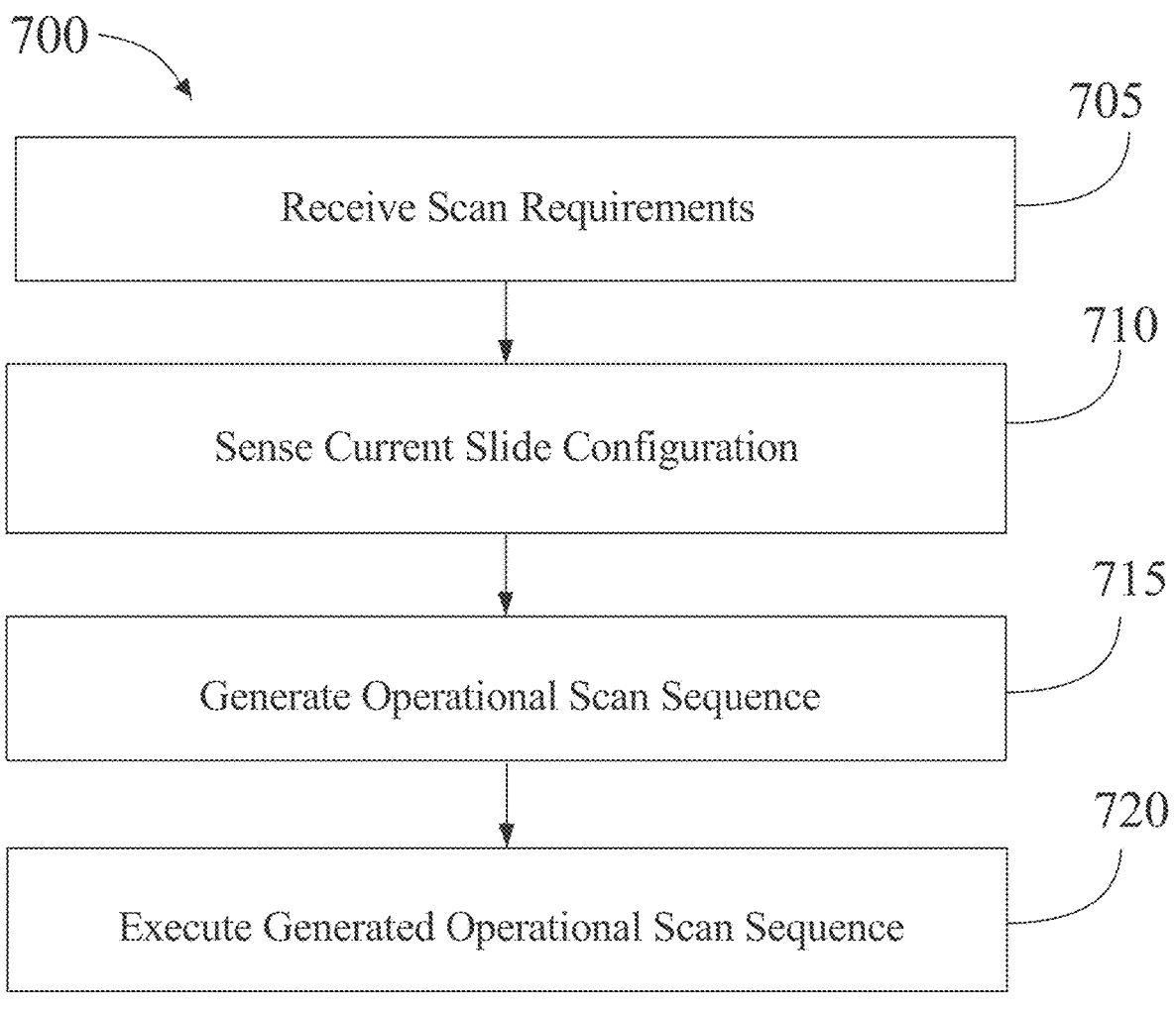
FIG. 7 is a flow diagram illustrating a method of retrieving and scanning glass slides.

Referring now to FIG. 7, a flow diagram of an exemplary method 700 for automated retrieval and scanning of glass slides within a restricted spatial environment is illustrated. At step 705, method 700 includes receiving, using at least a processor, a set of scan requirements from a user. This may be implemented as described and with reference to FIGS. 1-4.

Still referring to FIG. 7, at step 710, method 700 includes sensing, using the at least a processor, the current slide configuration. This may be implemented as described and with reference to FIGS. 1-4.

Still referring to FIG. 7, at step 715, method 700 includes generating, using the at least a processor, an operational scan sequence based on the received scan requirements and the identified slide configuration. This may be implemented as described and with reference to FIGS. 1-4.

Still referring to FIG. 7, at step 720, method 700 includes executing, using the at least a processor, the generated operational scan sequence. This may be implemented as described and with reference to FIGS. 1-4.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 8:
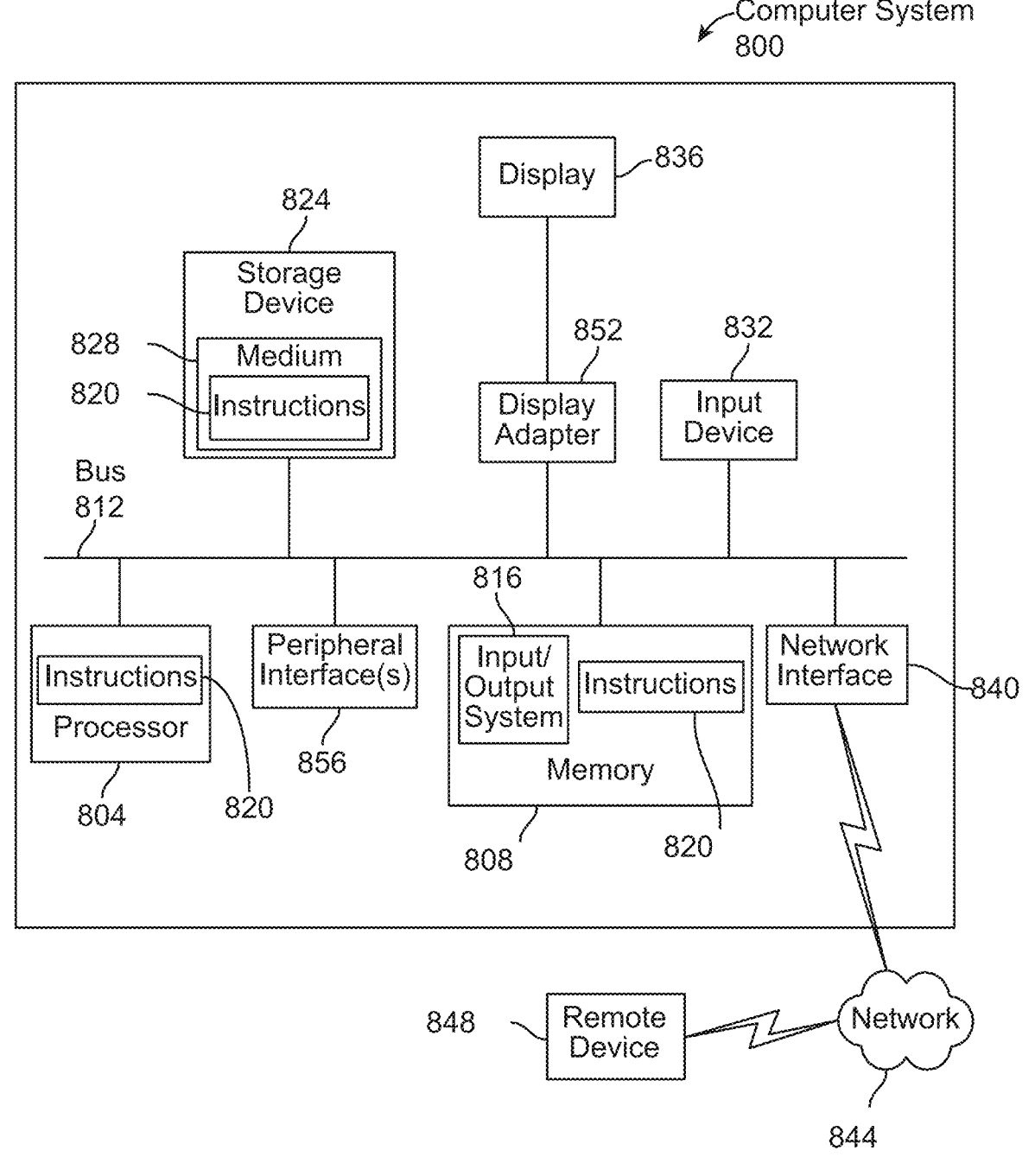
FIG. 8 is a block diagram of a computing system that can be used to implement any one or more of the methodologies disclosed herein and any one or more portions thereof.

FIG. 8 shows a diagrammatic representation of one embodiment of a computing device in the exemplary form of a computer system 800 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 800 includes a processor 804 and a memory 808 that communicate with each other, and with other components, via a bus 812. Bus 812 may include any of several types of bus structures including, but not limited to, a memory bus, a memory controller, a peripheral bus, a local bus, and any combinations thereof, using any of a variety of bus architectures.

Processor 804 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 804 may be organized according to Von Neumann and/or Harvard architecture as a non-limiting example. Processor 804 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), system on module (SOM), and/or system on a chip (SoC).

Memory 808 may include various components (e.g., machine-readable media) including, but not limited to, a random-access memory component, a read only component, and any combinations thereof. In one example, a basic input/output system 816 (BIOS), including basic routines that help to transfer information between elements within computer system 800, such as during start-up, may be stored in memory 808. Memory 808 may also include (e.g., stored on one or more machine-readable media) instructions (e.g., software) 820 embodying any one or more of the aspects and/or methodologies of the present disclosure. In another example, memory 808 may further include any number of program modules including, but not limited to, an operating system, one or more application programs, other program modules, program data, and any combinations thereof.

Computer system 800 may also include a storage device 824. Examples of a storage device (e.g., storage device 824) include, but are not limited to, a hard disk drive, a magnetic disk drive, an optical disc drive in combination with an optical medium, a solid-state memory device, and any combinations thereof. Storage device 824 may be connected to bus 812 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 824 (or one or more components thereof) may be removably interfaced with computer system 800 (e.g., via an external port connector (not shown)). Particularly, storage device 824 and an associated machine-readable medium 828 may provide nonvolatile and/or volatile storage of machine-readable instructions, data structures, program modules, and/or other data for computer system 800. In one example, software 820 may reside, completely or partially, within machine-readable medium 828. In another example, software 820 may reside, completely or partially, within processor 804.

Computer system 800 may also include an input device 832. In one example, a user of computer system 800 may enter commands and/or other information into computer system 800 via input device 832. Examples of an input device 832 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 832 may be interfaced to bus 812 via any of a variety of interfaces (not shown) including, but not limited to, a serial interface, a parallel interface, a game port, a USB interface, a FIREWIRE interface, a direct interface to bus 812, and any combinations thereof. Input device 832 may include a touch screen interface that may be a part of or separate from display 836, discussed further below. Input device 832 may be utilized as a user selection device for selecting one or more graphical representations in a graphical interface as described above.

A user may also input commands and/or other information to computer system 800 via storage device 824 (e.g., a removable disk drive, a flash drive, etc.) and/or network interface device 840. A network interface device, such as network interface device 840, may be utilized for connecting computer system 800 to one or more of a variety of networks, such as network 844, and one or more remote devices 848 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 844, may employ a wired and/or a wireless mode of communication. In general, any network topology may be used. Information (e.g., data, software 820, etc.) may be communicated to and/or from computer system 800 via network interface device 840.

Computer system 800 may further include a video display adapter 852 for communicating a displayable image to a display device, such as display device 836. Examples of a display device include, but are not limited to, a liquid crystal display (LCD), a cathode ray tube (CRT), a plasma display, a light emitting diode (LED) display, and any combinations thereof. Display adapter 852 and display device 836 may be utilized in combination with processor 804 to provide graphical representations of aspects of the present disclosure. In addition to a display device, computer system 800 may include one or more other peripheral output devices including, but not limited to, an audio speaker, a printer, and any combinations thereof. Such peripheral output devices may be connected to bus 812 via a peripheral interface 856. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve the methods according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

The invention claimed is:

1. A system for automated slide retrieval and scanning, wherein the system comprises:
 a gripper apparatus;
 a stainer basket configured to hold a plurality of slides in a corresponding plurality of individual slide slots;
 a stainer basket adapter configured to support the stainer basket, wherein the stainer basket adapter structure that comprises:
 a vertical support for a stainer basket;
 a profile configured to differentiate slides by height within the stainer basket, wherein the profile has an inclined base; and
 a locking mechanism, wherein the locking mechanism has a locked state in which the locking mechanism is configured to make the stainer basket stationary and an unlocked state in which the stainer basket is removable;
 at least one processor, and a memory communicatively configuring the at least one processor, the memory containing instructions configuring the at least one processor to:
 receive, from a user, a set of scan requirements, wherein the scan requirements are imported using at least a chatbot interaction;
 identify a current slide configuration for the stainer basket;
 detect individual slide slots as a function of a slide weight, wherein a pressure sensor associated with each individual slide slot measures a slide pressure against a threshold pressure, and wherein the pressure sensor transmits a positively identified signal when the slide pressure exceeds the threshold pressure;
 generate an operational scan sequence based on the received set of scan requirements and the current slide configuration, wherein generating the operational scan sequence further comprises identifying a minimum gripper movement in compliance with the user's set of scan requirements, wherein identifying the minimum gripper movement comprises computing a score associated with each operational scan sequence based on calculated gripper movements and selecting scan sequences to minimize or maximize the score; and
 automatedly execute the generated operational scan sequence using the gripper apparatus.

2. The system of claim 1, wherein receiving the set of scan requirements comprises receiving a complete specified order of slides to be scanned.

3. The system of claim 1, wherein receiving the set of scan requirements comprises receiving a prioritization method and range of slides to be scanned.

4. The system of claim 1, wherein generating the operational scan sequence comprises:
 computing a candidate sequence with minimum gripper movements that complies with the set of scan requirements; and
 generating the operational scan sequence using the candidate sequence.

5. The system of claim 1, wherein the stainer basket adapter comprises a ball locking mechanism to keep the stainer basket stationary during slide insertions and withdrawals but allowing for stainer basket removal by a user.

6. The system of claim 1, wherein generating the operational scan sequence comprises using height differentiation between elevated and lowered slides to prioritize retrieval of elevated slides before lowered slides.

7. The system of claim 1, further comprising an intermediate stainer basket configured to retain transitory displaced slides.

8. The system of claim 7, wherein the operational scan sequence includes depositing a transitory displaced slide into the intermediate stainer basket.

9. A method for automated slide retrieval and placement, wherein the method comprises:
 using a stainer basket to hold a plurality of slides in a corresponding plurality of individual slide slots;
 using a stainer basket adapter to support the stainer basket, wherein the stainer basket adapter comprises:
 a vertical support for a stainer basket;
 a profile configured to differentiate slides by height within the stainer basket, wherein the profile has an inclined base; and a locking mechanism, wherein the locking mechanism has a locked state in which the locking mechanism is configured to make a stainer basket stationery and an unlocked state in which the stainer basket is removable;

receiving, by at least one processor, from a user, a set of scan requirements, wherein the scan requirements are imported using at least a chatbot interaction;

identifying, by the at least one processor, a current slide configuration for the stainer basket;

sensing individual slide slots as a function of a slide weight, wherein a pressure sensor associated with each individual slide slot measures a slide pressure against a threshold pressure, and wherein the pressure sensor transmits a positively identified signal when the slide pressure exceeds the threshold pressure;

generating, by the at least one processor, an operational scan sequence based on the received set of scan requirements and the current slide configuration, wherein generating the operational scan sequence further comprises identifying a minimum gripper movement in compliance with the user's set of scan requirements, wherein identifying the minimum gripper movement comprises computing a score associated with each operational scan sequence based on calculated gripper movements and selecting scan sequences to minimize or maximize the score; and automatedly executing, by the at least one processor, the generated operational scan sequence using a gripper apparatus.

10. The method of claim 9, wherein receiving the set of scan requirements comprises receiving, by the at least a processor, a complete specified order of slides to be scanned.

11. The method of claim 9, wherein receiving the set of scan requirements comprises receiving, by at least one processor, a prioritization method and range of slides to be scanned.

12. The method of claim 9, wherein receiving the set of scan requirements comprises receiving, by the at least one processor, general user direction to scan all slides.

13. The method of claim 9, wherein generating the operational scan sequence based on the received set of scan requirements and the current slide configuration comprises using a state machine to generate, by the at least one processor, the operational scan sequence to scan a first set of raised slides and then scan a second set of sunken slides.

14. The method of claim 9, wherein generating the operational scan sequence based on the received set of scan requirements and the current slide configuration comprises using a state machine to generate, by the at least one processor, the operational scan sequence to temporarily displace one or more slides that are inhibiting access to a slide selected to be scanned in advance of the one or more inhibiting slides.

15. The method of claim 9, wherein generating the operational scan sequence based on the received set of scan requirements and the current slide configuration comprises heuristically developing, by the at least one processor, a set of gripper actions to scan all designated slides.

16. The method of claim 9, wherein generating the operational scan sequence comprises using height differentiation between elevated and lowered slides to prioritize retrieval of elevated slides before lowered slides.

17. The method of claim 9, wherein executing the operational scan sequence includes depositing a transitory displaced slide into an intermediate stainer basket configured to retain transitory displaced slides.

\* \* \* \* \*